(12) United States Patent
Peng et al.

(10) Patent No.: US 11,974,181 B2
(45) Date of Patent: Apr. 30, 2024

(54) CELL RESELECTION METHOD AND COMMUNICATIONS APPARATUS

(71) Applicant: Huawei Technologies Co., Ltd., Shenzhen (CN)

(72) Inventors: Wenjie Peng, Shanghai (CN); Jun Wang, Shanghai (CN); Mingzeng Dai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 304 days.

(21) Appl. No.: 17/214,794

(22) Filed: Mar. 26, 2021

(65) Prior Publication Data

US 2021/0219200 A1 Jul. 15, 2021

Related U.S. Application Data

(63) Continuation of application No. PCT/CN2019/107430, filed on Sep. 24, 2019.

(30) Foreign Application Priority Data

Sep. 27, 2018 (CN) .......................... 201811129684.X

(51) Int. Cl.
*H04W 4/00* (2018.01)
*H04W 4/40* (2018.01)
(Continued)

(52) U.S. Cl.
CPC ............. *H04W 36/08* (2013.01); *H04W 4/40* (2018.02); *H04W 36/24* (2013.01)

(58) Field of Classification Search
CPC ....... H04W 36/08; H04W 4/40; H04W 36/24; H04W 48/18; H04W 36/0005; H04W 36/0083; H04W 36/30
(Continued)

(56) References Cited

U.S. PATENT DOCUMENTS

2014/0004862 A1  1/2014  Ekemark
2018/0014317 A1*  1/2018  Gulati ................... H04L 5/001
(Continued)

FOREIGN PATENT DOCUMENTS

CN  102238483 A  11/2011
CN  105519191 A  4/2016
(Continued)

OTHER PUBLICATIONS

"Cell Selection and Reselection Consideration for Network Slicing", 3GPP TSG-RAN WG2 #97bis, R2-1702530, Spokane, USA, total 4 pages, 3rd Generation Partnership Project, Valbonne France (Apr. 3-7, 2017).
(Continued)

*Primary Examiner* — Marcos Batista
(74) *Attorney, Agent, or Firm* — Leydig, Voit & Mayer, Ltd.

(57) ABSTRACT

A first terminal device obtains a first parameter related to a first air interface, and then determines, based on the first parameter, that first frequency information of a second air interface has a highest priority, where the first air interface is a radio interface between the first terminal device and a second terminal device, and the second air interface is a radio interface between the first terminal device and a network device.

16 Claims, 4 Drawing Sheets

(51) Int. Cl.
  *H04W 36/08*  (2009.01)
  *H04W 36/24*  (2009.01)
(58) Field of Classification Search
  USPC .......................................... 370/331; 455/312
  See application file for complete search history.

(56) References Cited

U.S. PATENT DOCUMENTS

| | | | |
|---|---|---|---|
| 2018/0139593 A1 | 5/2018 | Chun et al. | |
| 2018/0139669 A1 | 5/2018 | Jung et al. | |
| 2021/0195389 A1* | 6/2021 | Novlan | H04W 84/20 |

FOREIGN PATENT DOCUMENTS

| | | | | |
|---|---|---|---|---|
| CN | 106257958 A | 12/2016 | | |
| CN | 106559849 A | 4/2017 | | |
| EP | 2966925 A2 * | 1/2016 | ........ | H04W 72/0413 |
| WO | 2013170413 A1 | 11/2013 | | |
| WO | 2018082674 A1 | 5/2018 | | |

OTHER PUBLICATIONS

"3rd Generation Partnership Project; Technical Specification Group Radio Access Network; NR; User Equipment (UE) procedures in Idle mode and RRC Inactive state(Release 15)", 3GPP TS 38.304 V15.0.0, 25 pages, 3rd Generation Partnership Project, Valbonne France (Jun. 2018).

Xiaomi, "Visibility of Slicing to UE", 3GPP TSG-RAN WG2 #97bis, Spokane, USA, R2-1702529, 5 pages, 3rd Generation Partnership Project, Valbonne France (Apr. 3-7, 2017).

Huawei (Rapporteur), "Introduction of SC-PTM for FeMTC and Nb-Iot," 3GPP TSG-RAN WG2 #97, Athens, Greece, R2-1702274, total 44 pages, 3rd Generation Partnership Project, Valbonne, France (Feb. 13-17, 2017).

"Providing QoS in UE-to-NW Relay scenario," SA WG2 Meeting #110AH, S2-152864 (revision of S2-152838), Sophia Antipolis, France, Total 10 pages, 3rd Generation Partnership Project, Valbonne, France (Aug. 31-Sep. 3, 2015).

* cited by examiner

CELL RESELECTION METHOD AND COMMUNICATIONS APPARATUS

CROSS-REFERENCE TO RELATED APPLICATIONS

This application is a continuation of International Application No. PCT/CN2019/107430, filed on Sep. 24, 2019, which claims priority to Chinese Patent Application No. 201811129684.X, filed on Sep. 27, 2018. The disclosures of the aforementioned applications are herein incorporated by reference in their entireties.

TECHNICAL FIELD

This application relates to the field of communications technologies, and in particular, to a cell reselection method and a communications apparatus.

BACKGROUND

Currently, vehicle communication in an intelligent transportation system (ITS) includes vehicle to vehicle (V2V) communication, vehicle to infrastructure (V2I) communication, vehicle to pedestrian (V2P) communication, vehicle to network (, V2N) communication, and the like. The foregoing communication is collectively referred to as V2X (where X represents everything) communication.

In the V2I communication, two parties that participate in communication are a terminal device and a roadside infrastructure. In the V2N communication, two parties that participate in communication are a terminal device and an application server. In the V2P communication and the V2V communication, two parties that participate in communication are both terminal devices. In a long term evolution (LTE) system, to obtain a V2X service, a terminal device needs to preferentially select a cell that supports the V2X service to camp on. In a cell reselection process, provided that the terminal device finds a cell that can provide a V2X service, the terminal device sets a frequency priority of the cell as a highest priority, and camps on the cell with the highest frequency priority. A V2X service provided by a cell in an LTE communications system is referred to as an LTE V2X service.

With continuous development of technologies, a new radio (NR) communications system is currently introduced, and a V2X service provided by a cell in the NR system is referred to as an NR V2X service. After the NR V2X service is introduced, some cells provide only LTE V2X services, some cells can provide both LTE V2X services and NR V2X services, and some cells provide only NR V2X services. The terminal device continues to use a cell reselection manner in the LTE system, to be specific, once the terminal device finds the cell that supports the V2X service, the frequency priority of the cell is set as the highest priority regardless of a type of a radio access technology (RAT) supported by the cell. In this case, it is likely that a to-be-camped cell, namely, the cell with the highest priority, does not support a V2X service requirement of the terminal device. Therefore, how to select the to-be-camped cell to meet the V2X service requirement of the terminal device is actually a problem to be urgently resolved in the industry.

SUMMARY

Embodiments of this application provide a cell reselection method and a communications apparatus, so that a cell that is reselected by a terminal device and on which the terminal device camps can meet a V2X service requirement of the terminal device.

According to a first aspect, an embodiment of this application provides a cell reselection method. The method may be used for a terminal device, or may be used for a chip in a terminal device. The following describes the method by using an example in which the method is used for the terminal device. The method includes: A first terminal device obtains a first parameter related to a first air interface. For example, a plurality of parameters are locally configured for the first air interface, and the first terminal device reads locally configured information, and obtains the first parameter from the plurality of parameters related to the first air interface. For another example, the first terminal device obtains the first parameter from a core network device. For example, the core network device is an MME network element, an AMF network element, or an SMF network element. For another example, a network device sends a plurality of parameters to the first terminal device by using a Uu interface, and the first terminal device receives, by using the Uu interface, the plurality of parameters sent by the network device, and determines the first parameter from the plurality of parameters. The first air interface is a radio interface between the first terminal device and a second terminal device. The first terminal device determines, based on the first parameter, that first frequency information of a second air interface has a highest priority, where the second air interface is a radio interface between the first terminal device and the network device. According to this solution, the first terminal device obtains the first parameter related to the first air interface, and then determines, based on the first parameter, that the first frequency information of the second air interface has the highest priority, where the first air interface is the radio interface between the first terminal device and the second terminal device, and the second air interface is the radio interface between the first terminal device and the network device. In this process, the first parameter related to the first air interface is considered when the first terminal device determines that the first frequency information of the second air interface has the highest priority. The following disadvantage is avoided: Once the first terminal device finds a cell that supports a V2X service, the first terminal device sets a frequency priority of the cell as the highest priority; and consequently, a to-be-camped cell does not support a service requirement of the first terminal device.

In an embodiment, that the first terminal device determines, based on the first parameter, that first frequency information of a second air interface has a highest priority includes: The first terminal device obtains the first frequency information. When the first terminal device is capable of performing, by using the first parameter, communication on the first air interface only when the first terminal device camps on a frequency corresponding to the first frequency information, the first terminal device determines that the first frequency information has the highest priority. According to this solution, the first parameter related to the first air interface, namely, a first parameter of the radio interface between the first terminal device and the second terminal device, is considered when the first terminal device configured to perform V2X communication determines that the first frequency information of the second air interface has the highest priority, so that the first terminal device is capable of performing, by using the first parameter, the communication on the first air interface when camping on the frequency corresponding to the first frequency information. The following disadvantage is avoided: Once the first terminal device finds the cell that supports the V2X service, the first terminal device sets the frequency priority of the cell as the highest priority; and consequently, the to-be-camped cell does not support the service requirement of the first terminal device.

In an embodiment, the first parameter is one with the highest priority in the plurality of parameters related to the first air interface. According to this solution, the first parameter is obtained.

In an embodiment, before the first terminal device obtains the first parameter related to the first air interface, the method further includes: The first terminal device obtains priority information, where the priority information includes at least one item, priorities of items are in descending order, and the first parameter is included in an item with the highest priority in the at least one item. According to this solution, the priority information including the plurality of parameters is flexibly obtained, so that the first terminal device configured to perform the V2X communication obtains the first parameter based on the priority information. Therefore, the first parameter related to the first air interface is considered when the first terminal device determines that the first frequency information of the second air interface has the highest priority. The following disadvantage is avoided: Once the first terminal device finds the cell that supports the V2X service, the first terminal device sets the frequency priority of the cell as the highest priority; and consequently, the to-be-camped cell does not support the service requirement of the first terminal device.

In an embodiment, after the first terminal device determines, based on the first parameter, that the first frequency information of the second air interface has the highest priority, the method further includes: The first terminal device camps on the frequency corresponding to the first frequency information. The first terminal device learns that the first parameter does not support a first V2X service, where the first V2X service is a V2X service to be executed by the first terminal device after the first terminal device camps on the frequency corresponding to the first frequency information. The first terminal device obtains, based on the first V2X service, a second parameter related to the first air interface, where the second parameter supports the first V2X service. The first terminal device determines, based on the second parameter, that second frequency information of the second air interface has the highest priority. According to this solution, after setting a priority of the first frequency information of the second air interface as the highest priority based on the first parameter related to the first air interface, the first terminal device configured to perform the V2X communication camps on the frequency corresponding to the first frequency information. In this case, if the first terminal device needs to transmit the first V2X service that is not supported by the first parameter, the first terminal device performs cell reselection based on the first V2X service, selects a Uu interface frequency indicated by the second frequency information to camp on, and performs the V2X communication. The following disadvantage is avoided: When the first terminal device camps on the frequency corresponding to the first frequency information, the first terminal device cannot process the first V2X service that is not supported by the first parameter.

In an embodiment, after the first terminal device determines, based on the first parameter, that the first frequency information of the second air interface has the highest priority, the method further includes: The first terminal device camps on the frequency corresponding to the first frequency information. The first terminal device performs the communication on the first air interface by using the first parameter, to process a first V2X service. The first terminal device determines whether the first parameter supports a second V2X service, where the second V2X service is a V2X service to be executed by the terminal device. If the first parameter does not support the second V2X service, and a priority of the second V2X service is higher than a priority of the first V2X service, the first terminal device obtains a second parameter related to the first air interface, and determines, based on the second parameter, that second frequency information of the second air interface has the highest priority, where the second parameter supports the first V2X service. According to this solution, after setting a priority of the first frequency information of the second air interface as the highest priority based on the first parameter related to the first air interface, the first terminal device configured to perform the V2X communication camps on the frequency corresponding to the first frequency information, and processes the first V2X service by using the first parameter. In this case, if a new second V2X service is initiated between the first terminal device and the second terminal device, the first terminal device determines to perform cell redirection based on the priority of the first V2X service and the priority of the second V2X service. The following disadvantage is avoided: The first terminal device cannot process a new service with a higher priority when camping on the frequency corresponding to the first frequency information to process an old service.

In an embodiment, after the first terminal device determines whether the first parameter supports the second V2X service, the method further includes: If the first parameter does not support the second V2X service, and a priority of the second V2X service is lower than a priority of the first V2X service, the first terminal device obtains a third parameter related to the first air interface, and determines, based on the third parameter, that third frequency information of the second air interface has the highest priority, where the third parameter supports the first V2X service and the second V2X service. According to this solution, after setting a priority of the first frequency information of the second air interface as the highest priority based on the first parameter related to the first air interface, the first terminal device configured to perform the V2X communication camps on the frequency corresponding to the first frequency information, and processes the first V2X service by using the first parameter. In this case, if a new second V2X service is initiated between the first terminal device and the second terminal device, the first terminal device determines to perform cell redirection based on the priority of the first V2X service and the priority of the second V2X service. The following disadvantage is avoided: The first terminal device cannot process a new service with a higher priority when camping on the frequency corresponding to the first frequency information to process an old service.

In an embodiment, the first parameter includes at least one of the following information: at least one piece of V2X frequency information, at least one piece of V2X service information, at least one piece of V2X communications standard information, or at least one piece of V2X quality of service (QoS) information. According to this solution, the first parameter is flexibly set, so that the first terminal device obtains the first parameter based on the priority information. Therefore, the first parameter related to the first air interface is considered when the first terminal device determines that the first frequency information of the second air interface has the highest priority. The following disadvantage is avoided: Once the first terminal device finds the cell that supports the V2X service, the first terminal device sets the frequency priority of the cell as the highest priority; and consequently, the to-be-camped cell does not support the service requirement of the first terminal device.

According to a second aspect, an embodiment of this application provides a cell reselection method. The method may be used for a network device, or may be used for a chip in a network device. The following describes the method by using an example in which the method is used for the network device. The method includes: The network device sends, to a first terminal device, a first parameter related to a first air interface, so that the first terminal device determines, based on the first parameter, that first frequency information of a second air interface has a highest priority, where the first air interface is a radio interface between the first terminal device and a second terminal device, and the second air interface is a radio interface between the first terminal device and the network device. According to this solution, the first terminal device obtains the first parameter related to the first air interface, and then determines, based on the first parameter, that the first frequency information of the second air interface has the highest priority, where the first air interface is the radio interface between the first terminal device and the second terminal device, and the second air interface is the radio interface between the first terminal device and the network device. In this process, the first parameter related to the first air interface is considered when the first terminal device determines that the first frequency information of the second air interface has the highest priority. The following disadvantage is avoided: Once the first terminal device finds a cell that supports a V2X service, the first terminal device sets a frequency priority of the cell as the highest priority; and consequently, a to-be-camped cell does not support a service requirement of the first terminal device.

In an embodiment, the first parameter is one with the highest priority in a plurality of parameters related to the first air interface. According to this solution, the first parameter is obtained.

In an embodiment, before the network device sends, to the first terminal device, the first parameter related to the first air interface, the method further includes: The network device sends priority information to the terminal device by using a radio resource control RRC message or a broadcast message, where the priority information includes at least one item, and priorities of items are in descending order. According to this solution, the priority information including the plurality of parameters is flexibly obtained, so that the first terminal device configured to perform V2X communication obtains the first parameter based on the priority information. Therefore, the first parameter related to the first air interface is considered when the first terminal device determines that the first frequency information of the second air interface has the highest priority. The following disadvantage is avoided: Once the first terminal device finds the cell that supports the V2X service, the first terminal device sets the frequency priority of the cell as the highest priority; and consequently, the to-be-camped cell does not support the service requirement of the first terminal device.

According to a third aspect, an embodiment of this application provides a communications apparatus. The communications apparatus has a function of implementing behavior of the terminal device in the foregoing method embodiment. The function may be implemented by hardware, or may be implemented by hardware executing corresponding software. The hardware or the software includes one or more modules corresponding to the foregoing function. The modules may be software and/or hardware.

In a possible design, a structure of the terminal device includes a processor. The processor is configured to: obtain a first parameter related to a first air interface, where the first air interface is a radio interface between a first terminal device and a second terminal device; and determine, based on the first parameter, that first frequency information of a second air interface has a highest priority, where the second air interface is a radio interface between the first terminal device and a network device.

In an embodiment, the first parameter includes at least one of the following information: at least one piece of V2X frequency information, at least one piece of V2X service information, at least one piece of V2X communications standard information, or at least one piece of V2X quality of service (QoS) information. According to this solution, the first parameter is flexibly set, so that the first terminal device obtains the first parameter based on priority information. Therefore, the first parameter related to the first air interface is considered when the first terminal device determines that the first frequency information of the second air interface has the highest priority. The following disadvantage is avoided: Once the first terminal device finds a cell that supports a V2X service, the first terminal device sets a frequency priority of the cell as the highest priority; and consequently, a to-be-camped cell does not support a service requirement of the first terminal device.

According to a fourth aspect, an embodiment of this application provides a communications apparatus. The communications apparatus has a function of implementing operations of the network device in the foregoing method embodiment. The function may be implemented by hardware, or may be implemented by hardware executing corresponding software. The hardware or the software includes one or more modules corresponding to the foregoing function.

In a possible design, a structure of the network device includes a transceiver. The transceiver is configured to send, to a first terminal device, a first parameter related to a first air interface, so that the first terminal device determines, based on the first parameter, that first frequency information of a second air interface has a highest priority, where the first air interface is a radio interface between the first terminal device and a second terminal device, and the second air interface is a radio interface between the first terminal device and the network device.

According to a fifth aspect, an embodiment of this application provides a communications apparatus. The communications apparatus includes a unit, a module, or a circuit configured to perform the method according to the first aspect or the possible embodiments of the first aspect. The communications apparatus may be a terminal device, or may be a module used for a terminal device, for example, may be a chip used for the terminal device.

According to a sixth aspect, an embodiment of this application provides a communications apparatus. The communications apparatus includes a unit, a module, or a circuit configured to perform the method according to the second aspect or the possible embodiments of the second aspect. The communications apparatus may be a network device, or may be a module used for a network device, for example, may be a chip used for the network device.

According to a seventh aspect, an embodiment of this application provides a computer program product including an instruction. When the computer program product runs on a computer, the computer is enabled to perform the method according to the first aspect or the possible embodiments of the first aspect.

According to an eighth aspect, an embodiment of this application provides a computer program product including an instruction. When the computer program product runs on a computer, the computer is enabled to perform the method according to the second aspect or the possible embodiments of the second aspect.

According to a ninth aspect, an embodiment of this application provides a computer-readable storage medium. The computer-readable storage medium stores an instruction. When the instruction is run on a computer, the computer is enabled to perform the method according to the first aspect or the possible embodiments of the first aspect.

According to a tenth aspect, an embodiment of this application provides a computer-readable storage medium. The computer-readable storage medium stores an instruction. When the instruction is run on a computer, the computer is enabled to perform the method according to the second aspect or the possible embodiments of the second aspect.

According to an eleventh aspect, an embodiment of this application provides a chip system. The chip system includes a processor, may further include a memory, and may further include a communications interface. The chip system is configured to implement a function of the first terminal device in the foregoing method. The chip system may include a chip, or may include a chip and another discrete device.

According to a twelfth aspect, an embodiment of this application provides a chip system. The chip system includes a processor, may further include a memory, and may further include a communications interface. The chip system is configured to implement a function of the network device in the foregoing method. The chip system may include a chip, or may include a chip and another discrete device.

According to the cell reselection method and the communications apparatus provided in the embodiments of this application, the first terminal device obtains the first parameter related to the first air interface, and then determines, based on the first parameter, that the first frequency information of the second air interface has the highest priority, where the first air interface is the radio interface between the first terminal device and the second terminal device, and the second air interface is the radio interface between the first terminal device and the network device. In this process, the first parameter related to the first air interface is considered when the first terminal device determines that the first frequency information of the second air interface has the highest priority. The following disadvantage is avoided: Once the first terminal device finds the cell that supports the V2X service, the first terminal device sets the frequency priority of the cell as the highest priority; and consequently, the to-be-camped cell does not support the service requirement of the first terminal device.

DESCRIPTION OF EMBODIMENTS

Figure 1:
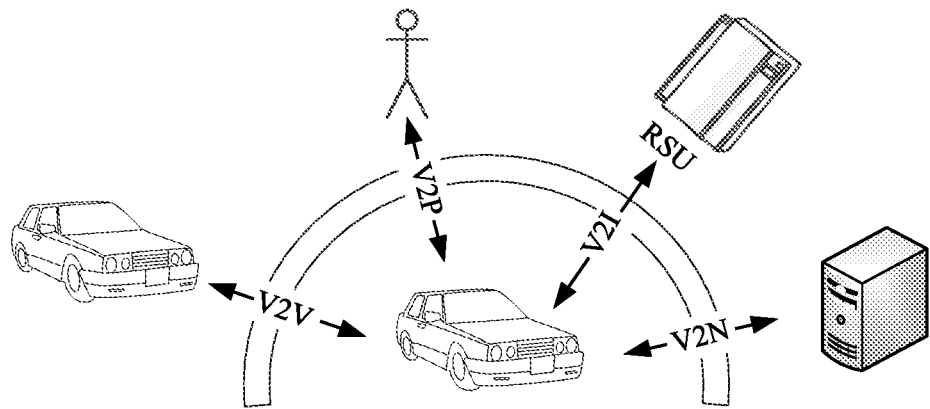
FIG. 1 is a schematic architectural diagram of V2X communication.

FIG. 1 is a schematic architectural diagram of V2X communication. As shown in FIG. 1, the V2X communication includes V2V communication, V2P communication, V2I communication, and V2N communication. In a V2X communication process, a V2X service is transmitted by using a sidelink or a Uu interface. In addition, the V2X service may be further classified according to a communications standard. For example, in an LTE communications system, a V2X service is referred to as an LTE V2X service, such as an LTE V2I service or an LTE V2V service. For another example, in an NR communications system, a V2X service is referred to as an NR V2X service, such as an NR V2I service, an NR V2V service, or an NR V2P service. A cell that can support the V2X service is referred to as a cell that can provide the V2X service. After the NR V2X service is introduced, some cells provide only LTE V2X services, some cells can provide both LTE V2X services and NR V2X services, and some cells provide only NR V2X services. A terminal device continues to use a cell reselection manner in an LTE system, to be specific, once the terminal device finds the cell that supports the V2X service, a frequency priority of the cell is set as a highest priority regardless of a type of a radio access technology (RAT) supported by the cell. In this case, it is likely that a to-be-camped cell, namely, the cell with the highest priority, does not support a V2X service requirement of the terminal device. For example, when a terminal device configured to perform the V2X communication camps on the cell that provides only the LTE V2X service, if the terminal device has an NR V2X service requirement, the V2X service requirement of the terminal device cannot be met. For another example, when the terminal device camps on the cell that provides only the NR V2X service, if the terminal device has an LTE V2X service requirement, a service requirement of the terminal device cannot be met either.

In view of this, embodiments of this application provide a cell reselection method and a communications apparatus, so that a cell that is reselected by the terminal device and on which the terminal device camps can meet the V2X service requirement of the terminal device.

The cell reselection method provided in the embodiments of this application is applicable to a 3rd generation mobile communications (3G) system, a long term evolution (LTE) system, a 4th generation mobile communications (4G) system, an advanced long term evolution (LTE-A) system, a cellular system related to a 3rd generation partnership project (3GPP), a 5th generation mobile communications (5G) system, and a subsequent evolved communications system.

A network device in the embodiments of this application may be a common base station (for example, a NodeB, an eNB, or a gNB), a new radio controller (NR controller), a centralized network element (centralized unit), a new radio base station, a remote radio module, a micro base station, a relay, a distributed network element (distributed unit), a transmission reception point (TRP), a transmission point (TP), or any other device. However, this embodiment of this application is not limited thereto.

The terminal device in the embodiments of this application, for example, a first terminal device or a second terminal device, is a terminal device having a V2X communication capability, and is a device that provides voice and/or data connectivity for a user, for example, a handheld device, a vehicle-mounted device, or a road side unit that has a wireless connection function. A common terminal device includes a mobile phone, a tablet, a notebook computer, a palmtop computer, a mobile internet device (MID), and a wearable device such as a smartwatch, a smart band, or a pedometer.

Figure 2:
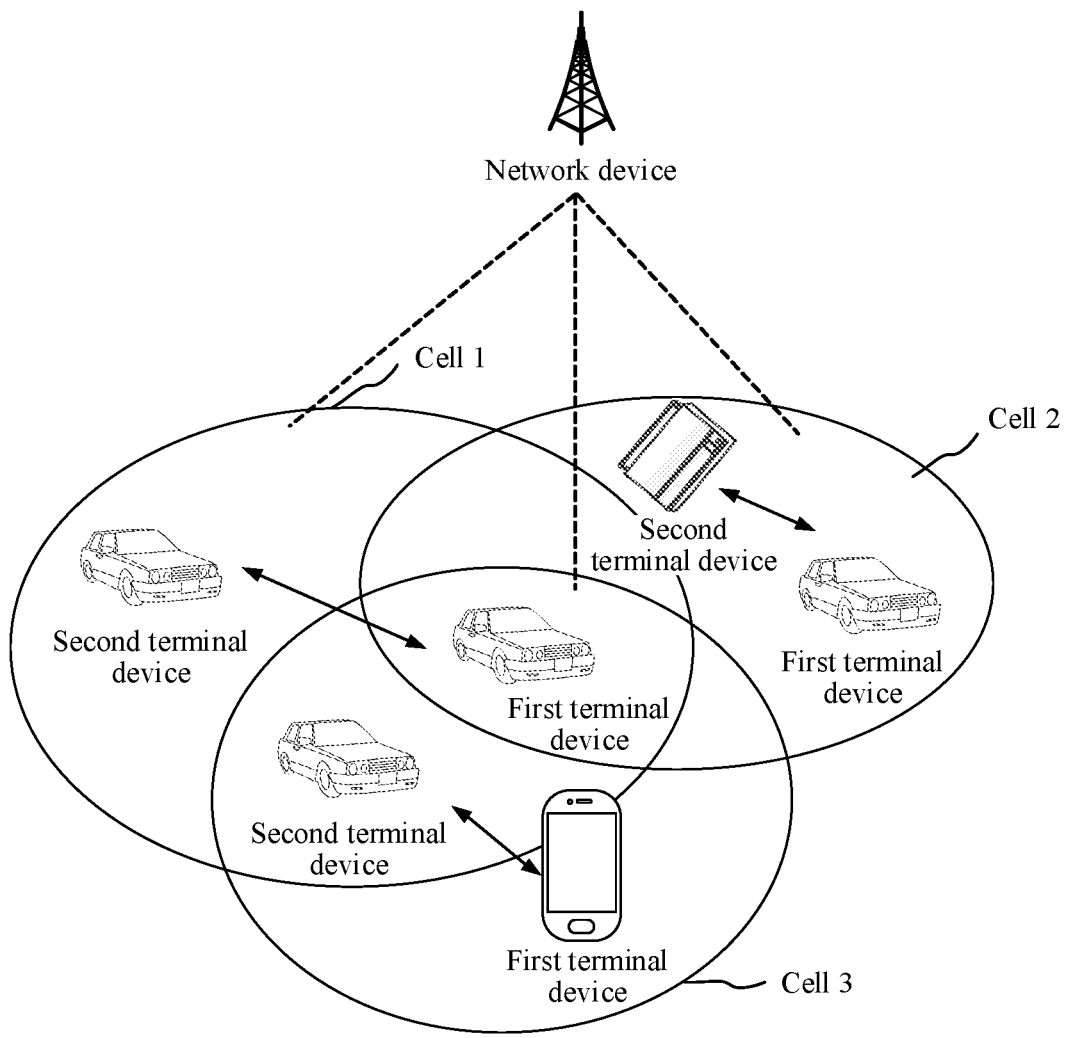
FIG. 2 is a schematic diagram of a system architecture to which a cell reselection method according to an embodiment of this application is applicable.

FIG. 2 is a schematic diagram of a system architecture to which a cell reselection method according to an embodiment of this application is applicable. Referring to FIG. 2, a first terminal device and a second terminal device are terminal devices having a V2X communication capability, and are configured to perform V2X communication. The V2X communication between the first terminal device and the second terminal device is performed by using a radio interface. Communication between the first terminal device and a network device or communication between the second terminal device and a network device is performed by using a radio interface. For clarity, the radio interface between the first terminal device and the second terminal device is referred to as a first air interface. For example, the first air interface is a sidelink. The radio interface between the first terminal device and the network device or the radio interface between the second terminal device and the network device is referred to as a second air interface. For example, the second air interface is a Uu interface. The following uses a 4G network architecture as an example to describe V2X service transmission performed by using the sidelink. For details, refer to FIG. 3A and FIG. 3B.

Figure 3A:
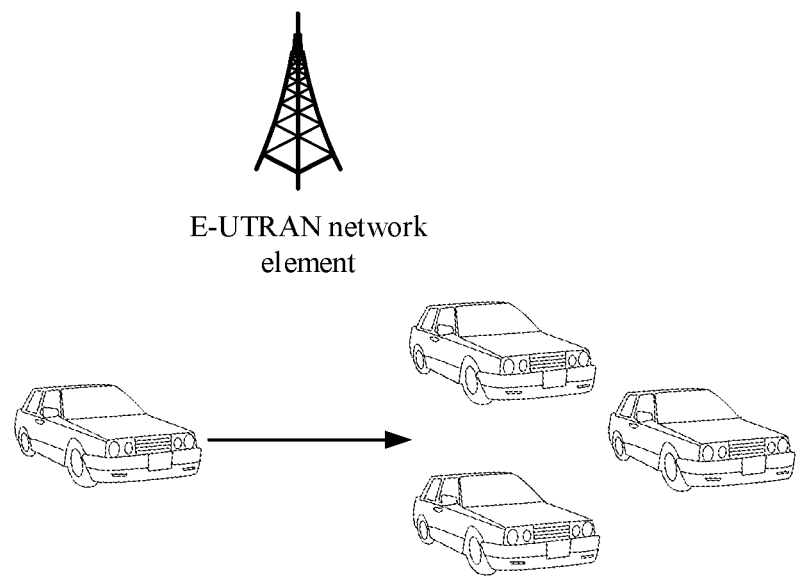
FIG. 3A is a schematic diagram of V2V service transmission that is performed by using a sidelink and to which a cell reselection method according to an embodiment of this application is applicable.

FIG. 3A is a schematic diagram of V2V service transmission that is performed by using a sidelink and to which a cell reselection method according to an embodiment of this application is applicable. As shown in FIG. 3A, in a 4G network architecture, a network device is specifically an evolved universal terrestrial radio access network (E-UTRAN) network element. A direct link may be established between an in-vehicle terminal device and a plurality of in-vehicle terminal devices, and communication is performed by using the direct link.

Figure 3B:
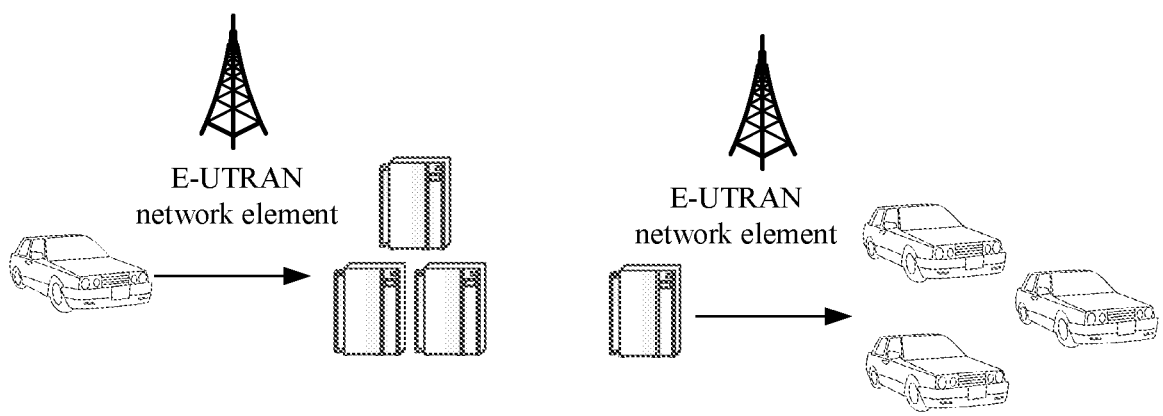
FIG. 3B is a schematic diagram of V2I service transmission that is performed by using a sidelink and to which a cell reselection method according to an embodiment of this application is applicable.

FIG. 3B is a schematic diagram of V2I service transmission that is performed by using a sidelink and to which a cell reselection method according to an embodiment of this application is applicable. As shown in FIG. 3B, a direct link is established between an in-vehicle terminal device and a plurality of road side units (RSUs), and communication is performed by using the direct link. Alternatively, a direct link is established between a road side unit and a plurality of in-vehicle terminal devices, and communication is performed by using the direct link.

Figure 3C:
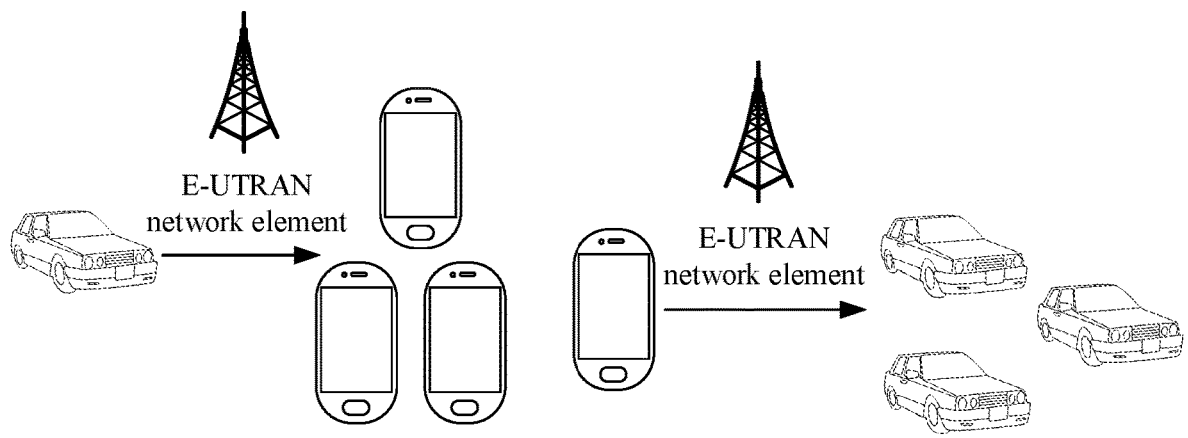
FIG. 3C is a schematic diagram of V2P service transmission that is performed by using a sidelink and to which a cell reselection method according to an embodiment of this application is applicable.

FIG. 3C is a schematic diagram of V2P service transmission that is performed by using a sidelink and to which a cell reselection method according to an embodiment of this application is applicable. As shown in FIG. 3C, a direct link is established between an in-vehicle terminal device and a mobile phone of a pedestrian, and communication is performed by using the direct link. Alternatively, a direct link is established between a mobile phone of a pedestrian and a plurality of in-vehicle terminal devices, and communication is performed by using the direct link.

In FIG. 3A to FIG. 3C, communication performed by using a direct link is referred to as a V2X sidelink communication mode. In this communication mode, the network device authorizes the terminal device, and then the terminal device is capable of performing V2X sidelink communication. The V2X sidelink communication mode is further classified into a centralized scheduling transmission mode and a distributed transmission mode. In the centralized scheduling transmission mode, each time the terminal device transmits a V2X service, the terminal device needs to request a resource from the network device. The mode is referred to as a mode 3 in an LTE V2X system, and is referred to as a mode 1 in an NR V2X system. In the distributed transmission mode, the network device configures one or more V2X sidelink resources. Each time the terminal device transmits a V2X service, a resource is obtained from the resources configured by a network, and does not need to be scheduled by the network device. The mode is referred to as a mode 4 in the LTE V2X system, and is referred to as a mode 2 in the NR V2X system.

Still referring to FIG. 2, a plurality of cells, for example, a cell 1, a cell 2, and a cell 3, are included in coverage of the network device. It is assumed that a network architecture is an NR network architecture and is downward compatible, the cell 1 can provide only an LTE V2X service, the cell 2 can provide only an NR V2X service, and the cell 3 can provide both an LTE V2X service and an NR V2X service. The cell 1 is used as an example. A first terminal device in the cell 1 is located in an overlapping part of the cell 1, the cell 2, and the cell 3. When the first terminal device configured to perform V2X communication needs to perform cell reselection, the first terminal device obtains a first parameter related to the first air interface, and determines, based on the first parameter, that first frequency information of the second air interface has a highest priority. For example, if the first parameter that is related to the first air interface and that is obtained by the first terminal device is a V2X communications standard, and the V2X communications standard is specifically NR V2X, the first terminal device sets, based on the V2X communications standard, a priority of frequency information of the cell 2 or the cell 3 as the highest priority. When subsequently selecting a to-be-camped frequency (namely, a to-be-camped cell), the first terminal device selects, according to a criterion S, the cell 2 or the cell 3 to camp on, instead of selecting, in a cell reselection manner in an LTE system in the prior art, the cell 1 to camp on.

It should be noted that there may be two explanations for that the cell can provide both the LTE V2X service and the NR V2X service. One explanation is that the cell can provide the LTE V2X service and the NR V2X service. The other explanation is that the cell can provide only one type of V2X service, for example, the LTE V2X service, and may further provide the NR V2X service for the first terminal device UE through another cell. That is, the cell (referred to as a local cell) adds a secondary cell for the first terminal device, and the local cell and the secondary cell respectively provide different V2X services for the first terminal device. For example, in a carrier aggregation (CA) network architecture, two cells may simultaneously provide V2X services to the first terminal device, where one cell provides the LTE V2X service for the first terminal device, and the other cell provides the NR V2X service for the first terminal device. Similarly, in a dual connectivity (dual connective, DC) network architecture, two cells may simultaneously provide V2X services for the first terminal device, where one cell provides the LTE V2X service for the first terminal device, and the other cell provides the NR V2X service for the first terminal device.

In addition, it should be noted that, the V2X service provided in this patent means that a cell can configure a V2X sidelink resource for UE, and/or schedule the V2X sidelink resource for the UE. V2X includes LTE V2X and NR V2X.

The following describes in detail the cell reselection method according to the embodiments of this application based on FIG. 1, FIG. 2, and FIG. 3A to FIG. 3C. For details, refer to FIG. 4.

Figure 4:
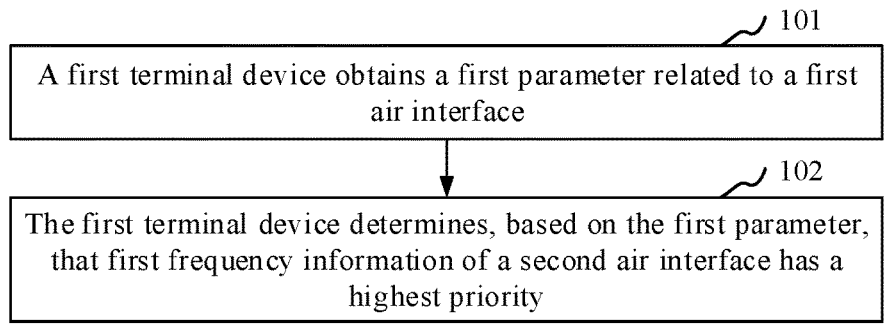
FIG. 4 is a flowchart of a cell reselection method according to an embodiment of this application.

FIG. 4 is a flowchart of a cell reselection method according to an embodiment of this application. In this embodiment, the cell reselection method in this application is described from a perspective of a first terminal device. This embodiment includes the following steps.

101: The first terminal device obtains a first parameter related to a first air interface.

The first air interface is a radio interface between the first terminal device and a second terminal device.

Referring to FIG. 3A, the first terminal device is an in-vehicle terminal device of a sender, and the second terminal device is one or more of a plurality of in-vehicle terminal devices of a receiver; or the first terminal device is one or more of a plurality of in-vehicle terminal devices of a receiver, and the second terminal device is an in-vehicle terminal device of a sender. Referring to FIG. 3B, the first terminal device is an in-vehicle terminal device, and the second terminal device is one or more of a plurality of road side units.

In this step, the first terminal device obtains the first parameter related to the first air interface. For example, a plurality of parameters are locally configured for the first air interface, and the first terminal device reads locally configured information, and obtains the first parameter from the plurality of parameters related to the first air interface. For another example, the first terminal device obtains the first parameter from a core network device. For example, the core network device is a mobility management entity (MME) network element in a 4G network, an access and mobility management function (AMF) network element or a session management function (SMF) network element in a 5G network, or a V2X control function (CF) node in a 4G network or a 5G network. For another example, a network device sends a plurality of parameters to the first terminal device by using a Uu interface, and the first terminal device receives, by using the Uu interface, the plurality of parameters sent by the network device, and determines the first parameter from the plurality of parameters. The first parameter includes at least one of the following information: at least one piece of V2X frequency information, at least one piece of V2X service information, at least one piece of V2X communications standard information, or at least one piece of V2X quality of service QoS information. For example, the V2X frequency information is a V2X frequency or a V2X frequency identifier; the V2X service information is a V2X service type or a V2X service identifier; the V2X communications standard is a V2X radio access technology (RAT) or V2X version information; and the V2X quality of service (QoS) information is a 5G quality of service indicator (5G QoS identifier, 5QI).

102: The first terminal device determines, based on the first parameter, that first frequency information of a second air interface has a highest priority.

The second air interface is a radio interface between the first terminal device and the network device, and the first frequency information is frequency information of any cell within coverage of the network device. For example, the first frequency information is a frequency of the second air interface or a frequency identifier of the second air interface.

In this step, the first frequency information corresponds to at least one frequency. Determining that the first frequency information has the highest priority is equivalent to determining that a frequency corresponding to the first frequency information has the highest priority.

In this step, the first terminal device determines, based on the first parameter related to the first air interface, that the first frequency information of the second air interface has the highest priority. In other words, the first terminal device configured to perform V2X communication determines, based on the first parameter used to execute a V2X service, first frequency information of a to-be-camped cell.

According to the cell reselection method provided in this embodiment of this application, the first terminal device obtains the first parameter related to the first air interface, and then determines, based on the first parameter, that the first frequency information of the second air interface has the highest priority, where the first air interface is the radio interface between the first terminal device and the second terminal device, and the second air interface is the radio interface between the first terminal device and the network device. In this process, the first parameter related to the first air interface is considered when the first terminal device determines that the first frequency information of the second air interface has the highest priority. The following disadvantage is avoided: Once the first terminal device finds a cell that supports the V2X service, the first terminal device sets a frequency priority of the cell as the highest priority; and consequently, the to-be-camped cell does not support a service requirement of the first terminal device.

In the foregoing embodiment, there are a plurality of parameters related to the first air interface, and the first terminal device determines the first parameter from the plurality of parameters. The following describes in detail how the first terminal device determines the first parameter from the plurality of parameters.

In a feasible embodiment, before obtaining the first parameter related to the first air interface, the first terminal device further obtains priority information, where the priority information includes at least one item, and priorities of items are in descending order. The first parameter is one with the highest priority in the plurality of parameters related to the first air interface.

For example, the first terminal device may obtain the priority information in the following several feasible manners.

Manner 1: The first terminal device obtains the priority information from a core network.

In this manner, the first terminal device obtains the priority information from the core network, such as the mobility management entity (MME) network element in the 4G network, the access and mobility management function (AMF) network element or the session management function (SMF) network element in the 5G network, or the V2X control function (CF) node in the 4G network or the 5G network.

Manner 2: The first terminal device obtains the priority information from the network device.

In this manner, the first terminal device obtains the priority information by receiving a radio resource control (RRC) message or a broadcast message sent by the network device.

Manner 3: The first terminal device obtains the priority information from locally preconfigured information.

In this manner, a first terminal device locally preconfigures the priority information as specified in a protocol.

The priority information obtained in the foregoing manners includes a plurality of items, and the first parameter is included in an item with the highest priority in the at least one item. For example, the priority information includes at least one item, and each item includes at least one piece of V2X frequency information; or the priority information includes at least one item, some items each include at least one piece of V2X frequency information, and the other items each include one piece of V2X frequency information. Alternatively, the priority information includes one item, and the item includes a plurality of pieces of V2X frequency information; or the priority information includes one item, and the item includes one piece of V2X frequency information. For another example, the priority information includes at least one item, and each item includes at least one piece of V2X communications standard information; or the priority information includes at least one item, some items each include at least one piece of V2X communications standard information, and the other items each include one piece of V2X communications standard information. Alternatively, the priority information includes one item, and the item includes a plurality of pieces of V2X communications standard information; or the priority information includes one item, and the item includes one piece of V2X communications standard information. When the priority information includes the V2X communications standard information, if a communications standard indicated by the V2X communications standard information is LTE V2X, LTE V2X may be further classified into R14 LTE V2X and R15 LTE V2X, and may further include R16 LTE V2X for further expansion; or if a communications standard indicated by the V2X communications standard information is NR V2X, similarly, NR V2X may be further classified into R16 NR V2X, R17 NR V2X that may be evolved subsequently, and the like.

In this embodiment, the priority information including the plurality of parameters is flexibly obtained, so that the first terminal device configured to perform the V2X communication obtains the first parameter based on the priority information. Therefore, the first parameter related to the first air interface is considered when the first terminal device determines that the first frequency information of the second air interface has the highest priority. The following disadvantage is avoided: Once the first terminal device finds the cell that supports the V2X service, the first terminal device sets the frequency priority of the cell as the highest priority; and consequently, the to-be-camped cell does not support the service requirement of the first terminal device.

In the foregoing embodiment, the first parameter includes at least one of the following information: the at least one piece of V2X frequency information, the at least one piece of V2X service information, the at least one piece of V2X communications standard information, or the at least one piece of V2X quality of service (QoS) information. The following separately describes in detail the information.

First, the V2X frequency information is described.

The V2X frequency information is used to indicate a V2X sidelink frequency. The V2X frequency information may be a specific V2X sidelink frequency, a specific V2X sidelink frequency identifier, or the like. The V2X sidelink frequency includes an LTE V2X sidelink frequency, an NR V2X sidelink frequency, a dedicated short range communications (Dedicated Short Range Communications, DSRC) frequency, an ITS frequency, and the like.

For example, when the first parameter is V2X sidelink frequency information, the network device needs to broadcast a V2X sidelink frequency supported by each cell. The network device may be a base station. In other words, the base station broadcasts the V2X sidelink frequency supported by each cell. The first terminal device receives broadcast information of the cell from the base station, and the broadcast information includes the V2X sidelink frequency supported by the cell.

Second, the V2X communications standard information is described.

The V2X communications standard information is used to indicate the V2X communications standard. Specifically, the V2X communications standard information may be the V2X communications standard, a V2X communications standard identifier, or the like. The V2X communications standard includes an LTE V2X communications standard, an NR V2X communications standard, and the like. As described above, version information of LTE V2X and NR V2X, such as R14 LTE V2X, R15 LTE V2X, and R16 NR V2X, may be further indicated, and a possible subsequent evolved version, such as R16 LTE V2X or R17 NR V2X, may be further included.

When the first parameter is the V2X communications standard information, the network device needs to broadcast a V2X communications standard supported by each cell. For example, the network device may broadcast the V2X communications standard information in an explicit or implicit manner. During explicit broadcast, the network device explicitly indicates, in the broadcast message, the V2X communications standard supported by the cell. During implicit broadcast, the network device does not explicitly indicate the V2X communications standard supported by the cell, but broadcasts a V2X resource configuration of the V2X communications standard. The network device may be the base station. Correspondingly, the UE receives the broadcast information of the cell from the base station.

Third, the V2X service information is described.

The V2X service information is used to indicate the V2X service. The V2X service information may be the V2X service type, the V2X service identifier, a destination identifier (destination ID), a provider service identifier (PSID), an intelligent transport systems application identifier (ITS-AID), or other information or another identifier indicating the V2X service. A V2X service indicated by the V2X service type includes a V2V service, a V2P service, a V2I service, a V2N service, or the like, or may be a multicast service, a unicast service, a broadcast service, or the like.

For example, each piece of V2X service information corresponds to one piece of V2X frequency information. Therefore, when the first parameter is specifically the V2X service information, the first terminal device can derive a priority of the V2X frequency information based on a correspondence between the V2X service information and the V2X sidelink frequency information and the priority information that includes the V2X service information. The correspondence between the V2X service information and the V2X sidelink frequency information may be configured by a V2X CF in the core network and sent to the first terminal device.

Optionally, each piece of V2X service information may alternatively correspond to a mode (for example, a mode 3 or a mode 4 in an LTE V2X system, or a mode 1 or a mode 2 in an NR V2X system) requirement. In this case, a mode supported by the V2X frequency information needs to be considered when the first terminal device derives a priority of the V2X frequency information based on a correspondence between the V2X service information and the V2X frequency information. To be specific, in an LTE system, only the mode 3 is supported, only the mode 4 is supported, or both the mode 3 and the mode 4 are supported. In the NR V2X system, only the mode 1 is supported, only the mode 2 is supported, or both the mode 1 and the mode 2 are supported.

For example, each piece of V2X service information corresponds to one piece of V2X communications standard information. Therefore, when the first parameter is specifically the V2X service information, the first terminal device can derive a priority of the V2X communications standard information based on a correspondence between the V2X service information and the V2X communications standard information and the priority information that includes the V2X service information. The correspondence between the V2X service information and the V2X communications standard information may be configured by a V2X CF in the core network and sent to the first terminal device.

It can be learned from the foregoing description that, when the first parameter is specifically the V2X service information, different V2X service information corresponds to different V2X frequency information. The first terminal device may determine the priority of the V2X frequency information based on the correspondence, and then obtain the first parameter based on the priority of the V2X frequency information. However, this embodiment of this application is not limited thereto. In another feasible embodiment, when the first parameter is specifically the V2X service information, the first terminal device may directly obtain the first parameter based on a priority of the V2X service information. In this case, if the first terminal device having a V2X communication capability is configured to perform the V2X communication, and the first terminal device is capable of performing, by using the first parameter, communication on the first air interface to process a service indicated by V2X service information with the highest priority, only when the first terminal device camps on the frequency corresponding to the first frequency information, the first terminal device can consider that a priority of the first frequency information is set as the highest priority.

When the first parameter is specifically the V2X service information, the network device needs to broadcast a V2X frequency supported by each cell while broadcasting V2X service information supported by each cell. Optionally, the network device further broadcasts a mode of the V2X service information supported by each cell.

Finally, the V2X QoS information is described.

The V2X QoS information is used to indicate V2X QoS. The V2X QoS information may be any one or more of a prose per packet priority (PPPP), prose per packet reliability (PPPR), a quality of service flow indicator (QoS flow indicator, QFI), or the 5G quality of service indicator (5G QoS Identifier). Each piece of V2X QoS information corresponds to one piece of V2X frequency information; or each piece of V2X QoS information corresponds to one piece of V2X communications standard information. When the first parameter is specifically the V2X QoS information, for a manner in which the first terminal device processes the V2X QoS information, refer to the foregoing manner in which the first terminal device processes the V2X service information. Details are not described herein again.

When the first parameter is specifically the V2X QoS information, the network device needs to broadcast a V2X frequency supported by each cell while broadcasting V2X QoS information supported by each cell. Alternatively, the network device does not broadcast V2X QoS information supported by each cell, but the first terminal device determines, through measurement or the like, the V2X QoS information supported by each cell.

In this embodiment, the first parameter is flexibly set, so that the first terminal device obtains the first parameter based on the priority information. Therefore, the first parameter related to the first air interface is considered when the first terminal device determines that the first frequency information of the second air interface has the highest priority. The following disadvantage is avoided: Once the first terminal device finds the cell that supports the V2X service, the first terminal device sets the frequency priority of the cell as the highest priority; and consequently, the to-be-camped cell does not support the service requirement of the first terminal device.

The following describes in detail how the first terminal device determines, based on the first parameter, that the first frequency information of the second air interface has the highest priority in the foregoing embodiment.

In a feasible embodiment, that the first terminal device determines, based on the first parameter, that first frequency information of a second air interface has a highest priority includes: The first terminal device obtains the first frequency information. When the first terminal device is capable of performing, by using the first parameter, the communication on the first air interface only when the first terminal device camps on the frequency corresponding to the first frequency information, the first terminal device may consider that the first frequency information has the highest priority.

For example, the first terminal device having the V2X communication capability is configured to perform the V2X communication, and the first terminal device is capable of performing, by using the first parameter, the communication on the first air interface, namely, the V2X communication only when the first terminal device camps on the frequency corresponding to the first frequency information.

For example, referring to FIG. 2, it is assumed that the first parameter is the V2X frequency information, for example, 5.9 GHz, a V2X frequency that can be supported by a cell 1 is 4.8 GHz, V2X frequencies that can be supported by a cell 2 and a cell 3 are 5.9 GHz, and Uu interface frequencies of the cell 2 and the cell 3 are the frequencies corresponding to the first frequency information. After obtaining the first parameter (5.9 GHz), a first terminal device in the cell 1 determines the first frequency information based on 5.9 GHz, where a cell corresponding to the first frequency information includes the cell 2 and the cell 3. In this case, if the first terminal device is configured to perform the V2X communication, the first terminal device is capable of performing, by using the first parameter, the communication on the first air interface when camping on the frequency (namely, the cell 2 or the cell 3) corresponding to the first frequency information. Therefore, the first terminal device can set the priority of the first frequency information as the highest priority. Then, the first terminal device determines, according to a criterion S, a to-be-camped cell from the cell 2 and the cell 3, and camps on the cell.

For another example, referring to FIG. 2, it is assumed that the first parameter is V2X standard information, for example, LTE V2X, a cell 1 can provide only the LTE V2X service, a cell 2 can provide only the NR V2X service, a cell 3 can provide both the LTE V2X service and the NR V2X service, and Uu interface frequencies of the cell 1, the cell 2, and the cell 3 are different. After obtaining the first parameter (the LTE V2X communications standard), a first terminal device in the cell 1 determines, based on the first parameter, two pieces of first frequency information, namely, first frequency information of the cell 1 and first frequency information of the cell 3. If the first terminal device is configured to perform the V2X communication, the first terminal device may set priorities of the first frequency information of the cell 1 and the first frequency information of the cell 3 as the highest priorities. When the first terminal device camps on the cell 1 or the cell 3, the first terminal device is capable of performing the communication on the first air interface by using the first parameter. Therefore, the first terminal device can set the priority of the first frequency information as the highest priority. Then, the first terminal device determines, according to a criterion S, a to-be-camped cell from the cell 1 and the cell 3, and camps on the cell. For example, the first parameter may alternatively be LTE V2X and NR V2X, and the first terminal device determines, based on the first parameter, that the first frequency information is the Uu interface frequency corresponding to the cell 3, so that the first terminal device can set the priority of the first frequency information of the cell 3 as the highest priority.

For still another example, it is assumed that the first parameter is the V2X service information, for example, the V2X service type, and the V2X service type is specifically a V2I service. If the first terminal device is configured to perform the V2X communication, after obtaining the first parameter, the first terminal device determines, based on the service information, frequency information or communications standard information corresponding to the service information, namely, the V2X frequency information or the V2X communications standard information related to the first air interface. Then, the first terminal device may consider, based on the V2X frequency information or the V2X communications standard information related to the first air interface, that the first frequency information of the second air interface has the highest priority. For details, refer to the foregoing example in which the first parameter is the V2X frequency information and the foregoing example in which the first parameter is the V2X communications standard information. Details are not described herein again.

For still another example, it is assumed that the first parameter is the V2X QoS information, for example, the prose per packet priority PPPP. If the first terminal device is configured to perform the V2X communication, after obtaining the first parameter, the first terminal device determines, based on the first parameter (namely, the prose per packet priority PPPP), frequency information or communications standard information corresponding to the first parameter, namely, the V2X frequency information or the V2X communications standard information related to the first air interface. Then, the first terminal device may consider, based on the V2X frequency information or the V2X communications standard information related to the first air interface, that the first frequency information of the second air interface has the highest priority. For details, refer to the foregoing example in which the first parameter is the V2X frequency information and the foregoing example in which the first parameter is the V2X communications standard information. Details are not described herein again. Although only the PPPP is used as an example for explanation herein, the PPPP is not construed as any limitation. The PPPP herein may alternatively be replaced with another QoS parameter mentioned above.

For still another example, it is assumed that the first parameter includes the V2X frequency information and the V2X communications standard information. In this case, a scenario in which different V2X communications standards share a V2X frequency, that is, the V2X frequency is indicated while the V2X communications standard information is indicated, is considered. A specific embodiment is similar to the foregoing example. Details are not described herein again.

For still another example, it is assumed that the first parameter is the V2X frequency information and the V2X service information. In this case, considering that the V2X service has a requirement on the V2X frequency, both the V2X frequency information and the V2X service information are limited. A specific embodiment is similar to the foregoing example. Details are not described herein again.

Optionally, when the first terminal device configured to perform the V2X communication selects a cell to camp on, a status of a V2X sidelink may be further considered. For example, although the cell corresponding to the first frequency information supports the first parameter, the V2X sidelink of the cell is in a relatively poor state. If a measurement result indicates excessively high sidelink load, the V2X sidelink of the cell cannot meet a V2X QoS requirement. Therefore, it is considered that a set of criteria S similar to those used for cell selection/reselection over the Uu interface are introduced into the V2X sidelink. In this case, before the cell/Uu interface frequency is considered suitable for camping, not only the cell or the Uu interface frequency corresponding to the first frequency information is required to support the first parameter, but also the measurement result of the V2X sidelink is required to meet a specific condition. For example, the measurement result of the V2X sidelink may be a channel busy ratio (CBR), or may be a measurement result that is based on a V2X sidelink reference signal. CBR measurement is used as an example. The network device (for example, the base station) or the core network device may configure a CRB threshold for the first terminal device. When a CBR measurement result that is of the V2X sidelink and that is obtained by the first terminal device through measurement is less than or is less than or equal to the CRB threshold or a value calculated based on the CRB threshold, the current cell/Uu interface frequency is considered suitable for camping.

According to the cell reselection method provided in this embodiment, the first parameter related to the first air interface, namely, a first parameter of the radio interface between the first terminal device and the second terminal device, is considered when the first terminal device configured to perform the V2X communication determines that the first frequency information of the second air interface has the highest priority, so that the first terminal device is capable of performing, by using the first parameter, the communication on the first air interface when camping on the frequency corresponding to the first frequency information. The following disadvantage is avoided: Once the first terminal device finds the cell that supports the V2X service, the first terminal device sets the frequency priority of the cell as the highest priority; and consequently, the to-be-camped cell does not support the service requirement of the first terminal device.

The following describes in detail how the first terminal device processes the V2X service by using the first parameter after setting the priority of the first frequency information as the highest priority in the foregoing embodiment.

In a feasible embodiment, after the first terminal device determines, based on the first parameter, that the first frequency information of the second air interface has the highest priority, the method further includes: The first terminal device camps on the frequency corresponding to the first frequency information. The first terminal device learns that the first parameter does not support a first V2X service, where the first V2X service is a V2X service to be executed by the first terminal device after the first terminal device camps on the frequency corresponding to the first frequency information. In this case, the first terminal device is triggered to perform cell reselection. For example, the first terminal device obtains, based on the first V2X service, a second parameter related to the first air interface, where the second parameter supports the first V2X service. The first terminal device may consider, based on the second parameter, that second frequency information of the second air interface has the highest priority. The first V2X service may be V2X service data sending, V2X service data receiving, or the like. When the first V2X service is the V2X service data sending, the first terminal device broadcasts V2X service data to a plurality of second terminal devices, or sends V2X service data to one second terminal device.

Optionally, after the first terminal device configured to perform the V2X communication sets the priority of the first frequency information as the highest priority according to the foregoing method, determines, according to the criterion S, the to-be-camped cell, and camps on the cell, the first parameter indicates at least one V2X frequency or at least one V2X communications standard. In this case, when the V2X service data needs to be sent or received, if the to-be-camped cell does not support a V2X frequency or a V2X communications standard required by the V2X service data, or if the to-be-camped cell does not support a V2X frequency or a V2X communications standard required by QoS of the V2X service data, the first terminal device is triggered to perform cell reselection. In a reselection process, the first terminal device determines, based on the priority information, to camp on a cell that can meet the V2X service data or the QoS of the V2X service data.

For example, referring to FIG. 2, it is assumed that the first parameter is the V2X frequency information, for example, 5.9 GHz, the V2X frequency that can be supported by the cell 1 is 4.8 GHz, the V2X frequencies that can be supported by the cell 2 and the cell 3 are 5.9 GHz, and the Uu interface frequencies of the cell 2 and the cell 3 are the frequencies corresponding to the first frequency information. After obtaining the first parameter (5.9 GHz), the first terminal device in the cell 1 determines the first frequency information based on 5.9 GHz, where the cell corresponding to the first frequency information includes the cell 2 and the cell 3. In this case, the first terminal device configured to perform the V2X communication is capable of performing, by using the first parameter, the communication on the first air interface when camping on the frequency (namely, the cell 2 or the cell 3) corresponding to the first frequency information. Therefore, the first terminal device can consider that the priority of the first frequency information is set as the highest priority. Then, the first terminal device determines, according to the criterion S, the to-be-camped cell from the cell 2 and the cell 3, and camps on the cell. It is assumed that the first terminal device finally camps on the cell 2 and needs to process the first V2X service after camping on the cell 2, the first V2X service is the V2X service data sending, the V2X frequency required by the V2X service data is 4.8 GHz, and the cell 2 does not support the V2X service data sending. In this case, the first terminal device determines, based on the first V2X service, the second parameter, namely, 4.8 GHz; then determines, based on the second parameter, the second frequency information, namely, the Uu interface frequency of the cell 1; and then sets a priority of the Uu interface frequency of the cell 1 as the highest priority.

In this embodiment, after setting the priority of the first frequency information of the second air interface as the highest priority based on the first parameter related to the first air interface, the first terminal device configured to perform the V2X communication camps on the frequency corresponding to the first frequency information. In this case, if the first terminal device needs to transmit the first V2X service that is not supported by the first parameter, the first terminal device performs cell reselection based on the first V2X service, selects a Uu interface frequency indicated by the second frequency information to camp on, and performs the V2X communication. The following disadvantage is avoided: When the first terminal device camps on the frequency corresponding to the first frequency information, the first terminal device cannot process the first V2X service that is not supported by the first parameter.

In a feasible embodiment, after the first terminal device determines, based on the first parameter, that the first frequency information of the second air interface has the highest priority, the method further includes: The first terminal device camps on the frequency corresponding to the first frequency information. The first terminal device performs the communication on the first air interface by using the first parameter, to process the first V2X service. A second V2X service is initiated between the first terminal device and the second terminal device. The first terminal device determines whether the first parameter supports the second V2X service, where the second V2X service is a V2X service to be executed by the terminal device. If the first parameter does not support the second V2X service, and a priority of the second V2X service is higher than a priority of the first V2X service, the first terminal device obtains the second parameter related to the first air interface, and determines, based on the second parameter, that the second frequency information of the second air interface has the highest priority, where the second parameter supports the first V2X service; or if the first parameter does not support the second V2X service, and a priority of the second V2X service is lower than a priority of the first V2X service, the first terminal device obtains a third parameter related to the first air interface, and determines, based on the third parameter, that third frequency information of the second air interface has the highest priority, where the third parameter supports the first V2X service and the second V2X service.

For example, after the first terminal device configured to perform the V2X communication sets the priority of the first frequency information as the highest priority according to the foregoing method, determines, according to the criterion S, the to-be-camped cell, and camps on the cell, the first parameter indicates at least one V2X frequency or at least one V2X communications standard and supports the first V2X service, so that the first terminal device executes the first V2X service on the first air interface by using the first parameter. A new V2X service is initiated in a process in which the first terminal device executes the first V2X service on the first air interface by using the first parameter. For example, the new V2X service is the second V2X service, and the first parameter does not support the second V2X service. In this case, the first terminal device processes the first V2X service and the second V2X service based on a specific scenario.

In the foregoing embodiment, before performing V2X communication, the first terminal device configured to perform the V2X communication needs to obtain the priority information of the V2X service. For example, the first terminal device may obtain the priority information of the V2X service from the base station or the core network device, or may perform priority processing as specified in the protocol.

Scenario 1: The priority of the second V2X service is higher than the priority of the ongoing first V2X service.

In this scenario, the first terminal device attempts to perform cell reselection. If the first terminal device can find the second parameter that can support the second V2X service, the first terminal device may consider, based on the second parameter, that the second frequency information of the second air interface has the highest priority.

For example, referring to FIG. 2, it is assumed that the first parameter is the V2X standard information, for example, LTE V2X, the cell 1 can provide only the LTE V2X service, the cell 2 can provide only the NR V2X service, the cell 3 can provide both the LTE V2X service and the NR V2X service, and the Uu interface frequencies of the cell 1, the cell 2, and the cell 3 are different. After obtaining the first parameter (the LTE V2X communications standard), the first terminal device in the cell 1 determines, based on the first parameter, the two pieces of first frequency information, namely, the first frequency information of the cell 1 and the first frequency information of the cell 3. The first terminal device may set the priorities of the first frequency information of the cell 1 and the first frequency information of the cell 3 as the highest priorities. When the first terminal device configured to perform the V2X communication camps on the cell 1 or the cell 3, the first terminal device is capable of performing the communication on the first air interface by using the first parameter. Therefore, the first terminal device sets the priority of the first frequency information as the highest priority. Then, the first terminal device determines, according to the criterion S, the to-be-camped cell from the cell 1 and the cell 3, and camps on the cell. It is assumed that the first terminal device finally camps on the cell 1 and processes the first V2X service in the cell 1, and the first V2X service is the LTE V2X service. When the first V2X service is being processed, the first terminal device needs to execute the second V2X service. For example, the second V2X service is the NR V2X service, and the priority of the second V2X service is higher than the priority of the first V2X service. In this case, the first terminal device performs cell reselection, and determines, based on the second V2X service, the second parameter, namely, the NR V2X service; and then sets, based on the second parameter, the frequency priority of the cell 2 or the cell 3 as the highest priority. Then, the first terminal device selects the cell 2 or the cell 3 to camp on, and processes the second V2X service. When the first terminal device camps on the cell 2, the first V2X service is interrupted; or when the first terminal device camps on the cell 3, the first terminal device processes both the first V2X service and the second V2X service.

Scenario 2: The priority of the ongoing first V2X service is higher than the priority of the second V2X service.

In this scenario, in an embodiment, the first terminal device attempts to perform cell reselection. If the first terminal device can find the third parameter that supports both the first V2X service and the second V2X service, the first terminal device may consider, based on the third parameter, that the third frequency information of a third air interface has the highest priority.

The example in the foregoing scenario 1 continues to be used. It is assumed that the first terminal device configured to perform the V2X communication finally camps on the cell 1 and processes the first V2X service in the cell 1, and the first V2X service is the LTE V2X service. When the first V2X service is being processed, the first terminal device needs to process the second V2X service. For example, the second V2X service is the NR V2X service, and the priority of the second V2X service is lower than the priority of the first V2X service. In this case, if there is a surrounding cell that supports both the first V2X service and the second V2X service, the first terminal device is triggered to perform cell reselection, and determines the third parameter based on the second V2X service and the first V2X service, namely, the LTE V2X service and the NR V2X service; and then sets, based on the third parameter, a priority of third frequency information that supports both the first V2X service and the second V2X service as the highest priority, where the third frequency information is frequency information of a Uu interface of the cell 3. Then, the first terminal device camps on the cell 3, and processes the first V2X service and the second V2X service.

In this scenario, in another embodiment, when the priority of the first V2X service is higher than the priority of the second V2X service, to ensure that service continuity of the first V2X service with the higher priority is not affected, cell reselection or another action is not triggered for the second V2X service with the lower priority, that is, communication of the second V2X service is not performed in this case.

In addition, in the foregoing embodiment, when the first terminal device configured to perform the V2X communication does not obtain the priority information of the V2X service in advance, if a new second V2X service is initiated when the first terminal device is processing the first V2X service, the first terminal device reports service information of the newly initiated second V2X service to the network device, and the network device determines whether the first terminal device needs to be handed over or redirected to a new cell. For example, when the network device determines that the second V2X service of the network device has a higher priority, the network device triggers handover or redirection, to hand over or redirect the first terminal device to a cell or a base station that needs to be capable of supporting the second V2X service, so that the communication of the second V2X service is ensured. In addition, the network device may alternatively not consider the priority of the first V2X service and the priority of the second V2X service, but find a cell or a network device that can support both the first V2X service and the second V2X service, and trigger handover or redirection, to hand over or redirect the first terminal device to the cell or the network device that can support both the first V2X service or the second V2X service, so that both the two V2X services can be ensured.

In this embodiment, after setting the priority of the first frequency information of the second air interface as the highest priority based on the first parameter related to the first air interface, the first terminal device configured to perform the V2X communication camps on the frequency corresponding to the first frequency information, and processes the first V2X service by using the first parameter. In this case, if the new second V2X service is initiated between the first terminal device and the second terminal device, the first terminal device determines to perform cell redirection based on the priority of the first V2X service and the priority of the second V2X service. The following disadvantage is avoided: The first terminal device cannot process a new service with a higher priority when camping on the frequency corresponding to the first frequency information to process an old service.

Figure 5:
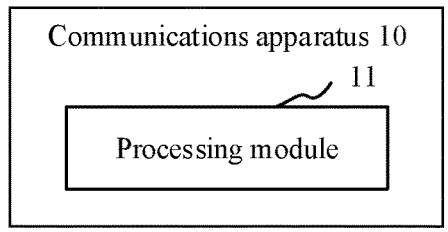
FIG. 5 is a schematic structural diagram of a communications apparatus according to an embodiment of this application.

FIG. 5 is a schematic structural diagram of a communications apparatus according to an embodiment of this application. The communications apparatus in this embodiment may be a terminal device, or may be a chip used for a terminal device. The communications apparatus may be configured to perform a function of the terminal device in the method embodiment shown in FIG. 4. As shown in FIG. 5, the communications apparatus 10 includes: a processing module 11, configured to: obtain a first parameter related to a first air interface, where the first air interface is a radio interface between a first terminal device and a second terminal device; and determine, based on the first parameter, that first frequency information of a second air interface has a highest priority, where the second air interface is a radio interface between the first terminal device and a network device.

In an embodiment, when determining, based on the first parameter, that the first frequency information of the second air interface has the highest priority, the processing module 11 is specifically configured to: obtain the first frequency information; and when the first terminal device is capable of performing, by using the first parameter, communication on the first air interface only when the first terminal device camps on a frequency corresponding to the first frequency information, determine, by the first terminal device, that the first frequency information has the highest priority.

In an embodiment, the first parameter is one with the highest priority in a plurality of parameters related to the first air interface.

In an embodiment, before obtaining the first parameter related to the first air interface, the processing module 11 is further configured to obtain priority information, where the priority information includes at least one item, priorities of items are in descending order, and the first parameter is included in an item with the highest priority in the at least one item.

In an embodiment, after determining, based on the first parameter, that the first frequency information of the second air interface has the highest priority, the processing module 11 is further configured to: control the first terminal device to camp on the frequency corresponding to the first frequency information; determine whether the first parameter supports a first V2X service, where the first V2X service is a V2X service to be executed by the first terminal device after the first terminal device camps on the frequency corresponding to the first frequency information; if the first parameter does not support the first V2X service, obtain, based on the first V2X service, a second parameter related to the first air interface, where the second parameter supports the first V2X service; and determine, based on the second parameter, that second frequency information of the second air interface has the highest priority.

In an embodiment, after determining, based on the first parameter, that the first frequency information of the second air interface has the highest priority, the processing module 11 is further configured to: control the first terminal device to camp on the frequency corresponding to the first frequency information; determine whether the first parameter supports a second V2X service, where the second V2X service is a V2X service to be executed by the terminal device; and if the first parameter does not support the second V2X service, and a priority of the second V2X service is higher than a priority of the first V2X service, obtain a second parameter related to the first air interface, and determine, based on the second parameter, that second frequency information of the second air interface has the highest priority, where the second parameter supports the first V2X service.

In an embodiment, if the processing module 11 determines that the first parameter does not support the second V2X service, and a priority of the second V2X service is lower than a priority of the first V2X service, the processing module 11 is configured to: obtain a third parameter related to the first air interface, and determine, based on the third parameter, that third frequency information of the second air interface has the highest priority, where the third parameter supports the first V2X service and the second V2X service.

In an embodiment, the first parameter includes at least one of the following information: at least one piece of V2X frequency information, at least one piece of V2X service information, at least one piece of V2X communications standard information, or at least one piece of V2X quality of service (QoS) information.

The communications apparatus provided in this embodiment of this application may perform an action of the terminal device in the foregoing method embodiment. Embodiment principles and technical effects thereof are similar. Details are not described herein again.

Figure 6:
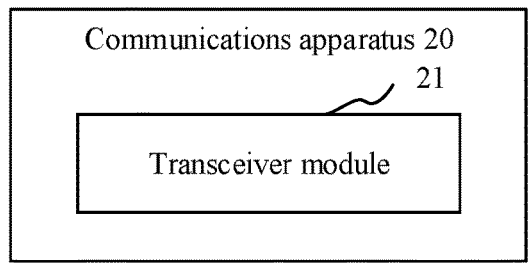
FIG. 6 is a schematic structural diagram of a communications apparatus according to an embodiment of this application.

FIG. 6 is a schematic structural diagram of a communications apparatus according to an embodiment of this application. The communications apparatus in this embodiment may be a network device, or may be a chip used for a network device. The communications apparatus may be configured to perform a function of the network device in the method embodiment shown in FIG. 4. As shown in FIG. 6, the communications apparatus 20 includes:

a transceiver module 21, configured to send, to a first terminal device, a first parameter related to a first air interface, so that the first terminal device determines, based on the first parameter, that first frequency information of a second air interface has a highest priority, where the first air interface is a radio interface between the first terminal device and a second terminal device, and the second air interface is a radio interface between the first terminal device and the network device.

In an embodiment, the first parameter is one with the highest priority in a plurality of parameters related to the first air interface.

In an embodiment, before sending, to the first terminal device, the first parameter related to the first air interface, the transceiver module 21 is further configured to send priority information to the terminal device by using a radio resource control RRC message or a broadcast message, where the priority information includes at least one item, and priorities of items are in descending order.

In an embodiment, the first parameter includes at least one of the following information: at least one piece of V2X frequency information, at least one piece of V2X service information, at least one piece of V2X communications standard information, or at least one piece of V2X quality of service QoS information.

The communications apparatus provided in this embodiment of this application may perform an action of the network device in the foregoing method embodiment. Embodiment principles and technical effects thereof are similar. Details are not described herein again.

It should be noted that the transceiver module may be a transceiver during actual embodiment. The processing module may be implemented in a form of software invoked by a processing element, or may be implemented in a form of hardware. For example, the processing module may be a separately disposed processing element, or may be integrated into a chip of the foregoing apparatus for embodiment. In addition, the processing module may be stored in a memory of the foregoing apparatus in a form of program code, and is invoked by a processing element of the foregoing apparatus to perform a function of the processing module. In addition, all or some of the modules may be integrated together, or may be implemented independently. The processing element herein may be an integrated circuit having a signal processing capability. In an embodiment process, steps in the foregoing method or the foregoing modules may be implemented by using a hardware integrated logical circuit in the processing element, or by using instructions in a form of software.

For example, the foregoing modules may be configured as one or more integrated circuits for implementing the foregoing method, such as one or more application-specific integrated circuits (ASIC), one or more microprocessors (DSP), or one or more field programmable gate arrays (FPGA). For another example, when one of the foregoing modules is implemented in a form of program code invoked by a processing element, the processing element may be a general-purpose processor, for example, a central processing unit (, CPU) or another processor that can invoke the program code. For another example, the modules may be integrated together, and implemented in a form of a system-on-a-chip (SOC).

Figure 7:
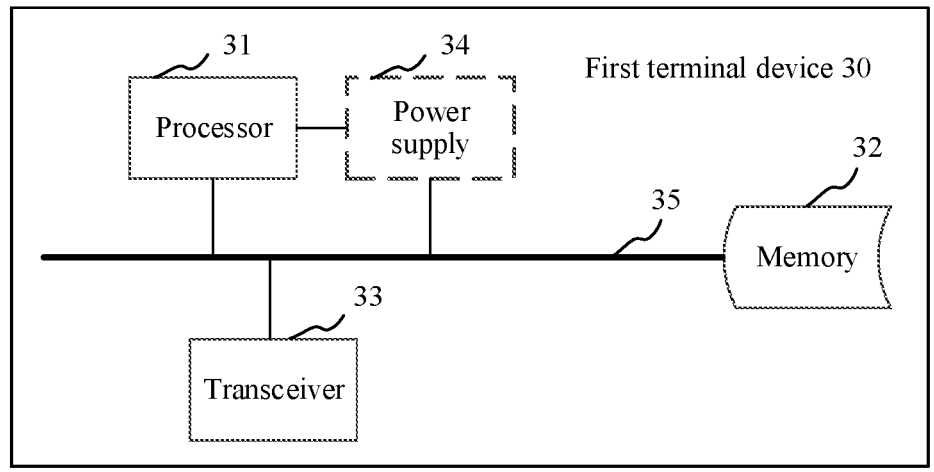
FIG. 7 is a schematic structural diagram of a first terminal device according to an embodiment of this application.

FIG. 7 is a schematic structural diagram of a first terminal device 30 according to an embodiment of this application. As shown in FIG. 7, the first terminal device 30 may include a processor 31 (for example, a CPU), a memory 32, and a transceiver 33. The transceiver 33 is coupled to the processor 31, and the processor 31 controls a sending and receiving action of the transceiver 33. The memory 32 may include a high-speed random access memory (RAM), and may further include a non-volatile memory (NVM), for example, at least one magnetic disk memory. The memory 32 may store various instructions, to complete various processing functions and implement steps of the method in this application. Optionally, the first terminal device in this application may further include a power supply 34 and a communications bus 35. The transceiver 33 may be integrated into a transceiver of the first terminal device, or may be an independent transceiver antenna of the first terminal device. The communications bus 35 is configured to implement a communication connection between elements.

In this embodiment of this application, the memory 32 is configured to store computer-executable program code, and the program code includes an instruction. When the processor 31 executes the instruction, the instruction enables the processor 31 of the first terminal device to perform a processing action of the first terminal device in the foregoing method embodiment, and enables the transceiver 33 to perform a sending and receiving action of the first terminal device in the foregoing embodiment or optional embodiment shown in FIG. 4. Embodiment principles and technical effects thereof are similar. Details are not described herein.

Figure 8:
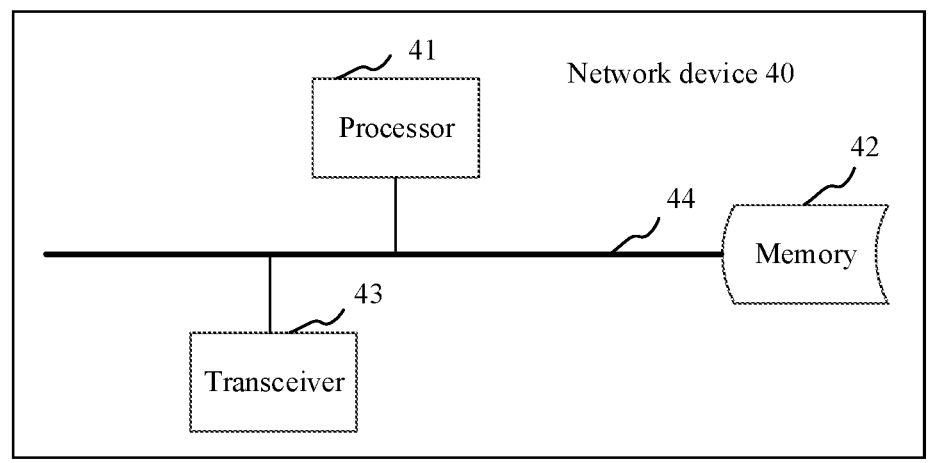
FIG. 8 is a schematic structural diagram of a network device according to an embodiment of this application.

FIG. 8 is a schematic structural diagram of a network device according to an embodiment of this application. As shown in FIG. 8, the network device 40 may include a processor 41 (for example, a CPU), a memory 42, and a transceiver 43. The transceiver 43 is coupled to the processor 41, and the processor 41 controls a sending and receiving action of the transceiver 43. The memory 42 may include a high-speed random access memory (RAM), and may further include a non-volatile memory (NVM), for example, at least one magnetic disk memory. The memory 42 may store various instructions, to complete various processing functions and implement steps of the method in this application. Optionally, the network device in this application may further include a communications bus 44. The transceiver 43 may be integrated into a transceiver of the network device, or may be an independent transceiver antenna of the network device. The communications bus 44 is configured to implement a communication connection between elements.

In this embodiment of this application, the memory 42 is configured to store computer-executable program code, and the program code includes an instruction. When the processor 41 executes the instruction, the instruction enables the processor 41 of the network device to perform a processing action of the network device in the foregoing embodiment or optional embodiment, and enables the transceiver 43 to perform a receiving action of the network device in the foregoing method embodiment. Embodiment principles and technical effects thereof are similar. Details are not described herein.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When a computer program instruction is loaded and executed on a computer, all or some of the procedures or functions according to the embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, a DVD), a semiconductor medium (for example, a solid-state drive (SSD)), or the like.

The term "a plurality of" in this specification means two or more than two. The term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects. In the formula, the character "/" indicates a "division" relationship between the associated objects.

It may be understood that numerical symbols used in the embodiments of this application are differentiated merely for ease of description, but are not used to limit the scope of the embodiments of this application.

It should be understood that sequence numbers of the foregoing processes do not mean execution sequences in the embodiments of this application. The execution sequences of the processes should be determined according to functions and internal logic of the processes, and should not be construed as any limitation on the embodiment processes of the embodiments of this application.

What is claimed is:

1. A cell reselection method applied in a first terminal device, comprising:
   obtaining a first parameter related to a first air interface, wherein the first air interface is a radio interface between the first terminal device and a second terminal device; and
   determining, based on the first parameter, that first frequency information of a second air interface has a highest priority, wherein a first frequency corresponds to the first frequency information, wherein the first frequency information has a highest priority comprises the first frequency has the highest priority, wherein the second air interface is a radio interface between the first terminal device and a network device,
   wherein the first parameter comprises at least one piece of vehicle to everything (V2X) communications standard information, and wherein a communications standard indicated by the V2X communications standard information is long term evolution (LTE) V2X or new radio (NR) V2X.

2. The method according to claim 1, wherein the determining based on the first parameter, that first frequency information of a second air interface has a highest priority comprises:
   obtaining the first frequency information; and
   in response to the first terminal device being capable of performing, using the first parameter, communication on the first air interface only in response to the first terminal device camping on the first frequency, determining-that the first frequency information has the highest priority.

3. The method according to claim 1, wherein the first parameter is a parameter with the highest priority in a plurality of parameters related to the first air interface.

4. The method according to claim 1, wherein the first parameter further comprises any one or more of the following information: at least one piece of V2X frequency information, at least one piece of V2X service information, or at least one piece of V2X quality of service (QoS) information.

5. A cell reselection method applied in a network device, comprising:
   sending to a first terminal device, a first parameter related to a first air interface, to enable the first terminal device to determine, based on the first parameter, that first frequency information of a second air interface has a highest priority, wherein a first frequency corresponds to the first frequency information, wherein the first frequency information has a highest priority comprises the first frequency has the highest priority, wherein the first air interface is a radio interface between the first terminal device and a second terminal device, and the second air interface is a radio interface between the first terminal device and the network device,
   wherein the first parameter comprises at least one piece of vehicle to everything (V2X) communications standard information, and wherein a communications standard indicated by the V2X communications standard information is long term evolution (LTE) V2X or new radio (NR) V2X.

6. The method according to claim 5, wherein the first parameter is a parameter with the highest priority in a plurality of parameters related to the first air interface.

7. The method according to claim 6, wherein before the sending to a first terminal device, the first parameter related to a first air interface, the method further comprises:
   sending the priority information to the first terminal device using a radio resource control (RRC) message or a broadcast message, wherein the priority information comprises at least one item, and priorities of items are in a descending order.

8. The method according to claim 5, wherein the first parameter further comprises at least one of the following information: at least one piece of V2X frequency information, at least one piece of V2X service information, or at least one piece of V2X quality of service (QoS) information.

9. A communications apparatus, comprising:
   at least one processor, and a memory storing instructions for execution by the at least one processor;
   wherein, when executed, the instructions cause the communications apparatus to perform operations comprising:
   obtaining, a first parameter related to a first air interface, wherein the first air interface is a radio interface between the communications apparatus and a second terminal device; and
   determining, device based on the first parameter, that first frequency information of a second air interface has a highest priority, wherein a first frequency corresponds to the first frequency information, wherein the first frequency information has a highest priority comprises the first frequency has the highest priority, wherein the second air interface is a radio interface between the communications apparatus and a network device,
   wherein the first parameter comprises at least one piece of vehicle to everything (V2X) communications standard information, and wherein a communications standard indicated by the V2X communications standard information is long term evolution (LTE) V2X or new radio (NR) V2X.

10. The communications apparatus according to claim 9, wherein, when executed, the instructions cause the communications apparatus to perform operations comprising:
    wherein the determining, device based on the first parameter, that first frequency information of a second air interface has a highest priority comprises:
    obtaining, the first frequency information; and
    in response to the terminal device being capable of performing, using the first parameter, communication on the first air interface only in response to the communications apparatus camping on the first frequency, and determining, that the first frequency information has the highest priority.

11. The communications apparatus according to claim 9, wherein the first parameter is a parameter with the highest priority in a plurality of parameters related to the first air interface.

12. The communications apparatus according to claim 9, wherein the first parameter further comprises any one or more of the following information: at least one piece of V2X frequency information, at least one piece of V2X service information, or at least one piece of V2X quality of service (QoS) information.

13. A communications apparatus, comprising:
at least one processor, and a memory storing instructions for execution by the at least one processor;
wherein, when executed, the instructions cause the communications apparatus to perform operations comprising:
sending, to a first terminal device, a first parameter related to a first air interface, to enable the first terminal device to determine, based on the first parameter, that first frequency information of a second air interface has a highest priority, wherein a first frequency corresponds to the first frequency information, wherein the first frequency information has a highest priority comprises the first frequency has the highest priority, wherein the first air interface is a radio interface between the first terminal device and a second terminal device, and the second air interface is a radio interface between the first terminal device and communications apparatus,
wherein the first parameter comprises at least one piece of vehicle to everything (V2X) communications standard information, and wherein a communications standard indicated by the V2X communications standard information is long term evolution (LTE) V2X or new radio (NR) V2X.

14. The communications apparatus according to claim 13, wherein the first parameter is a parameter with the highest priority in a plurality of parameters related to the first air interface.

15. The communications apparatus according to claim 14, wherein, when executed, the instructions cause the communications apparatus to perform operations comprising:
wherein before the sending, to a first terminal device, a first parameter related to a first air interface, the operations further comprises:
sending, priority information to the first terminal device using a radio resource control (RRC) message or a broadcast message, wherein the priority information comprises at least one item, and priorities of items are in a descending order.

16. The communications apparatus according to claim 13, wherein the first parameter further comprises at least one of the following information: at least one piece of V2X frequency information, at least one piece of V2X service information, or at least one piece of V2X quality of service (QoS) information.

* * * * *